(12) United States Patent
Shimoda et al.

(10) Patent No.: US 11,021,212 B2
(45) Date of Patent: Jun. 1, 2021

(54) BICYCLE BATTERY UNIT WITH PROTECTOR

(71) Applicant: Shimano Inc., Osaka (JP)

(72) Inventors: Makoto Shimoda, Osaka (JP); Yoshitaka Nose, Osaka (JP); Yuya Yoneda, Osaka (JP); Taihei Nishihara, Osaka (JP)

(73) Assignee: Shimano Inc., Osaka (JP)

( * ) Notice: Subject to any disclaimer, the term of this patent is extended or adjusted under 35 U.S.C. 154(b) by 138 days.

(21) Appl. No.: 15/635,074

(22) Filed: Jun. 27, 2017

(65) Prior Publication Data

US 2018/0001785 A1    Jan. 4, 2018

(30) Foreign Application Priority Data

Jun. 29, 2016 (JP) .............................. JP2016-129030

(51) Int. Cl.
| | |
|---|---|
| *B62M 6/90* | (2010.01) |
| *B62K 19/40* | (2006.01) |
| *B60L 50/64* | (2019.01) |
| *B62K 19/30* | (2006.01) |
| *B62J 43/00* | (2020.01) |

(52) U.S. Cl.
CPC .............. *B62M 6/90* (2013.01); *B60L 50/64* (2019.02); *B62K 19/30* (2013.01); *B62K 19/40* (2013.01); *B60L 2200/12* (2013.01); *B62J 43/00* (2020.02); *Y02T 10/70* (2013.01)

(58) Field of Classification Search
CPC .. B60L 11/1879; B60L 2200/12; B60L 50/64; B62K 19/40; B62K 19/30; B62K 2208/00; B62M 6/90; Y02T 10/705; Y02T 10/7005; Y02T 10/70; B62J 43/00
See application file for complete search history.

(56) References Cited

U.S. PATENT DOCUMENTS

| | | | |
|---|---|---|---|
| 2010/0183910 A1* | 7/2010 | Nishino .............. | H01M 2/1055 429/163 |
| 2010/0237585 A1* | 9/2010 | Binggeli ................ | B62K 19/30 280/288.4 |
| 2011/0042156 A1* | 2/2011 | Vincenz ................ | B62H 5/001 180/206.5 |

(Continued)

FOREIGN PATENT DOCUMENTS

| | | |
|---|---|---|
| CN | 1161915 A | 10/1997 |
| CN | 202449164 U | 9/2012 |

(Continued)

OTHER PUBLICATIONS

Machine translation of WO 2007/119710, Yoshiie et al., 2007 (Year: 2007).*

(Continued)

*Primary Examiner* — Kwang Han
(74) *Attorney, Agent, or Firm* — Global IP Counselors, LLP (57) ABSTRACT

A bicycle battery unit is configured to reduce the effect of contact with an obstacle. The bicycle battery unit includes a plurality batteries, a housing accommodating the batteries and a protector. The protector is integrally provided on at least a portion of the outer surface of the housing. The protector has a lower hardness than a hardness of the housing.

16 Claims, 5 Drawing Sheets

(56) References Cited

U.S. PATENT DOCUMENTS

| | | |
|---|---|---|
| 2012/0070718 A1 | 5/2012 | Motohashi |
| 2014/0127543 A1 | 5/2014 | Cho |
| 2014/0329119 A1 | 11/2014 | Tirone et al. |
| 2017/0073042 A1* | 3/2017 | Evensen .................. B62M 6/90 |

FOREIGN PATENT DOCUMENTS

| | | | | |
|---|---|---|---|---|
| CN | 202754095 U | | 2/2013 | |
| EP | 0905014 | * | 2/2004 | ............ B62M 23/02 |
| EP | 2 918 490 A1 | | 9/2015 | |
| JP | 2000-238675 A | | 9/2000 | |
| JP | 2011040203 A | * | 2/2011 | ............. H01M 2/10 |
| JP | 2011-60624 A | | 3/2011 | |
| JP | 2015-174539 A | | 10/2015 | |
| JP | 3204600 U | | 6/2016 | |
| WO | WO 2007/119710 | * | 10/2007 | ............. B62J 11/00 |

OTHER PUBLICATIONS

Machine translation of JP2011040203A, Imaizumi, 2011 (Year: 2011).*

* cited by examiner

BICYCLE BATTERY UNIT WITH PROTECTOR

CROSS-REFERENCE TO RELATED APPLICATIONS

This application claims priority to Japanese Patent Application No. 2016-129030, filed on Jun. 29, 2016. The entire disclosure of Japanese Patent Application No. 2016-129030 is hereby incorporated herein by reference.

BACKGROUND

Field of the Invention

The present invention relates to a bicycle battery unit.

Background Information

Japanese Laid-Open Patent Publication No. 2000-238675 (Patent document 1) discloses a bicycle battery unit that includes batteries and a housing. The batteries are accommodated in the housing. The housing is accommodated in a receptacle formed in the frame of a bicycle. A cover, which forms a portion of the bicycle frame, is coupled to one side wall of the housing. The bicycle frame completely covers the bicycle battery unit and protects the bicycle battery unit from an obstacle such as gravel lifted from the road surface as the bicycle travels.

SUMMARY

There are a variety of bicycle frames. Thus, even in a case in which the housing is coupled to a bicycle frame without the cover so that one side wall of the housing exposed to the outside, it is desirable that the effect of an obstacle that comes into contact with the housing be reduced.

In accordance with a first aspect of the present invention, a bicycle battery unit basically includes a plurality of batteries, a housing and a protector. The housing accommodates the batteries. The protector is integrally provided with at least a portion of an outer surface of the housing. The protector has a lower hardness than a hardness of the housing. With the bicycle battery unit according to the first aspect, the protector is provided on at least a portion of the outer surface of the housing. This limits contact of an obstacle with the outer surface of the housing. An obstacle forced toward the bicycle battery unit contacts the protector. This limits damage to the housing. The protector absorbs kinetic energy more easily than the housing. Thus, even when an obstacle comes into contact with the protector, the transmission of the impact to the housing is limited.

In accordance with a second aspect of the present invention, the bicycle battery unit according to the first aspect is configured so that the protector is provided on one side wall of the housing so as not to extend outward from a periphery of the one side surface. With the bicycle battery unit according to the second aspect, the protector does not extend beyond one side wall of the housing. This avoids enlargement of the bicycle battery unit, and the protector does not interfere with coupling and removal of the bicycle battery unit to and from a battery holder or the like.

In accordance with a third aspect of the present invention, a bicycle battery unit includes a plurality of batteries, a housing and a protector. The housing accommodates the plurality of batteries. The protector is provided on one side wall of the housing so as not to extend outward from a periphery of the one side surface. With the bicycle battery unit according to the third aspect, the protector is arranged on one side wall of the housing. This limits contact of an obstacle with one side wall of the housing. An obstacle forced toward the bicycle battery unit contacts the protector. This limits damage to the housing. Further, the protector does not extend beyond one side surface of the housing. This avoids enlargement of the bicycle battery unit, and the protector does not interfere with coupling and removal of the bicycle battery unit to and from a battery holder or the like.

In accordance with a fourth aspect of the present invention, the bicycle battery unit according to the third aspect is configured so that the protector has a lower hardness than a hardness of the housing. With the bicycle battery unit according to the fourth aspect, since the protector has a lower hardness than the housing, the protector absorbs kinetic energy of an obstacle more easily than the housing. This limits the transmission of the impact to the housing.

In accordance with a fifth aspect of the present invention, the bicycle battery unit according to any one of the second to fourth aspects is configured so that the protector is provided on the housing so that a peripheral portion of the one side surface of the housing is exposed from the protector. With the bicycle battery unit according to the fifth aspect, the protector is not provided on the peripheral portion of one side wall of the housing. Thus, the protector does not interfere with coupling and removal of the bicycle battery unit to and from a battery holder or the like.

In accordance with a sixth aspect of the present invention, the bicycle battery unit according to any one of the preceding aspects is configured so that in a state in which the housing is coupled to a coupling portion of the bicycle, the protector is provided on the housing to be exposed from the coupling portion. With the bicycle battery unit according to the sixth aspect, the protector is arranged on a portion of the housing that is exposed from the coupling portion of the bicycle where an obstacle is apt to contact. Thus, the housing is effectively protected.

In accordance with a seventh aspect of the present invention, the bicycle battery unit according to any one of the preceding aspects is configured so that the protector is formed integrally with the housing as a one-piece member. With the bicycle battery unit according to the seventh aspect, since the protector is formed integrally with the housing, the protector is arranged in contact with the housing regardless of the shape of the housing.

In accordance with an eighth aspect of the present invention, the bicycle battery unit according to any one of the first to sixth aspects is configured so that the protector is adhered, applied, or welded to the housing. With the bicycle battery unit according to the eighth aspect, even when the protector and the housing are formed from different materials, the protector can easily be coupled to the housing.

In accordance with a ninth aspect of the present invention, the bicycle battery unit according to any one of the preceding aspects is configured to that the protector is formed from a resin. With the bicycle battery unit according to the ninth aspect, the protector can be formed to be lightweight.

In accordance with a tenth aspect of the present invention, the bicycle battery unit according to any one of the preceding aspects is configured so that the protector is formed from a material including nylon or an elastomer. With the bicycle battery unit according to the tenth aspect, the protector can be formed from a material that is easy to process such as nylon or an elastomer.

In accordance with an eleventh aspect of the present invention, in the bicycle battery unit according to any one of the preceding aspects is configured so that the protector has a flat outer surface. With the bicycle battery unit according to the eleventh aspect, it becomes easy for a user to remove stain from the outer surface of the protector.

In accordance with a twelfth aspect of the present invention, the bicycle battery unit according to any one of the preceding aspects further includes a display provided on the housing, wherein the protector is provided on the housing so that the display is exposed from the protector. With the bicycle battery unit according to the twelfth aspect, the protector does not cover the display. Thus, the user can easily recognize the display regardless of the material of the protector.

In accordance with a thirteenth aspect of the present invention, the bicycle battery unit according to any one of the preceding aspects further includes an operation portion arranged on the housing. The protector is arranged on the housing so that the operation portion is exposed from the protector. With the bicycle battery unit according to the thirteenth aspect, the protector does not cover the operation portion. Thus, the operation portion is easy to operate for a user.

In accordance with a fourteenth aspect of the present invention, the bicycle battery unit according to any one of the preceding aspects further includes a cover coupling portion located on the housing. The protector is arranged on the housing so that the cover coupling portion is exposed from the protector. With the bicycle battery unit according to the fourteenth aspect, the protector does not cover the cover coupling portion. This allows the cover to be easily coupled to the cover coupling portion.

In accordance with a fifteenth aspect of the present invention, the bicycle battery unit according to any one of the preceding aspects is configured so that the cover coupling portion includes a threaded hole. With the bicycle battery unit according to the fifteenth aspect, a bolt is engaged with the threaded hole. This allows a cover to be easily coupled to and removed from the housing.

The bicycle battery unit reduces the effect of a contacting obstacle.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Figure 1:
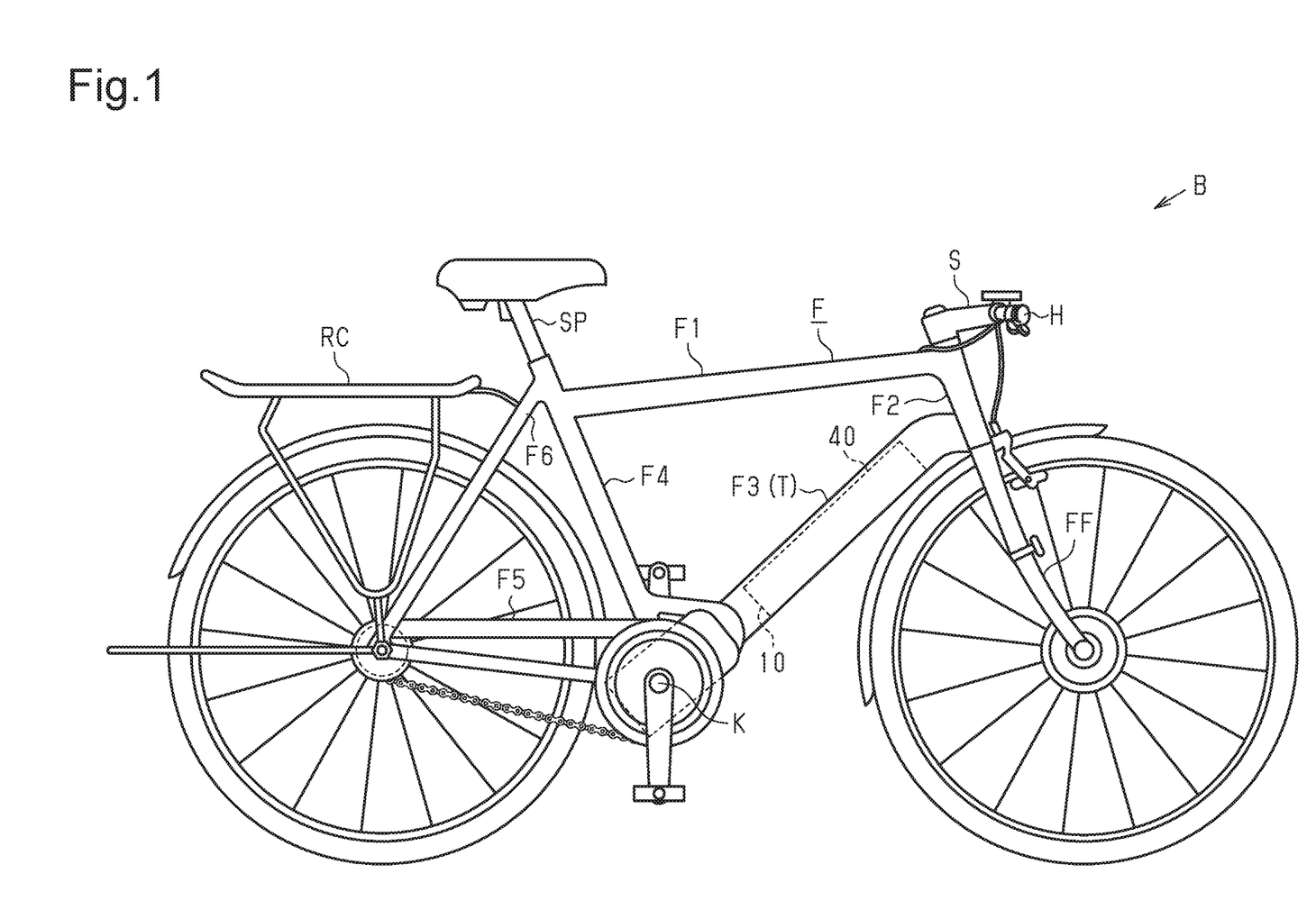
FIG. 1 is a side view showing a bicycle including one embodiment of a battery unit.

FIG. 1 shows a bicycle B that includes a battery component 10. The battery component 10 is used in a state coupled to a coupling portion T of the bicycle B. The coupling portion T of the bicycle B includes at least one of a frame F, a front fork FF, a handlebar H, a stem 5, a seatpost SP, a front carrier (not shown) and a rear carrier RC. The frame F includes a top tube F1, a head tube F2, a down tube F3, a seat tube F4, a chainstay F5 and a seatstay F6. In the example shown in FIG. 1, the battery component 10 is coupled to the down tube F3.

In a state in which the bicycle B is on level ground, the down tube F3 extends downward toward a crankshaft K. The down tube F3 includes an opening FA, which is open toward the lower side when the bicycle B is on level ground. The down tube F3 defines a receptacle FS (refer to FIG. 2), which is configured to accommodate a battery component 10. The receptacle FS and the opening FA are continuous. The opening FA is sized to allow the battery component 10 to be inserted into the receptacle FS. The receptacle FS is sized to allow for accommodation of the entire battery component 10. The battery component 10 is accommodated through the opening FA in the receptacle FS and coupled to the down tube F3.

Figure 2:
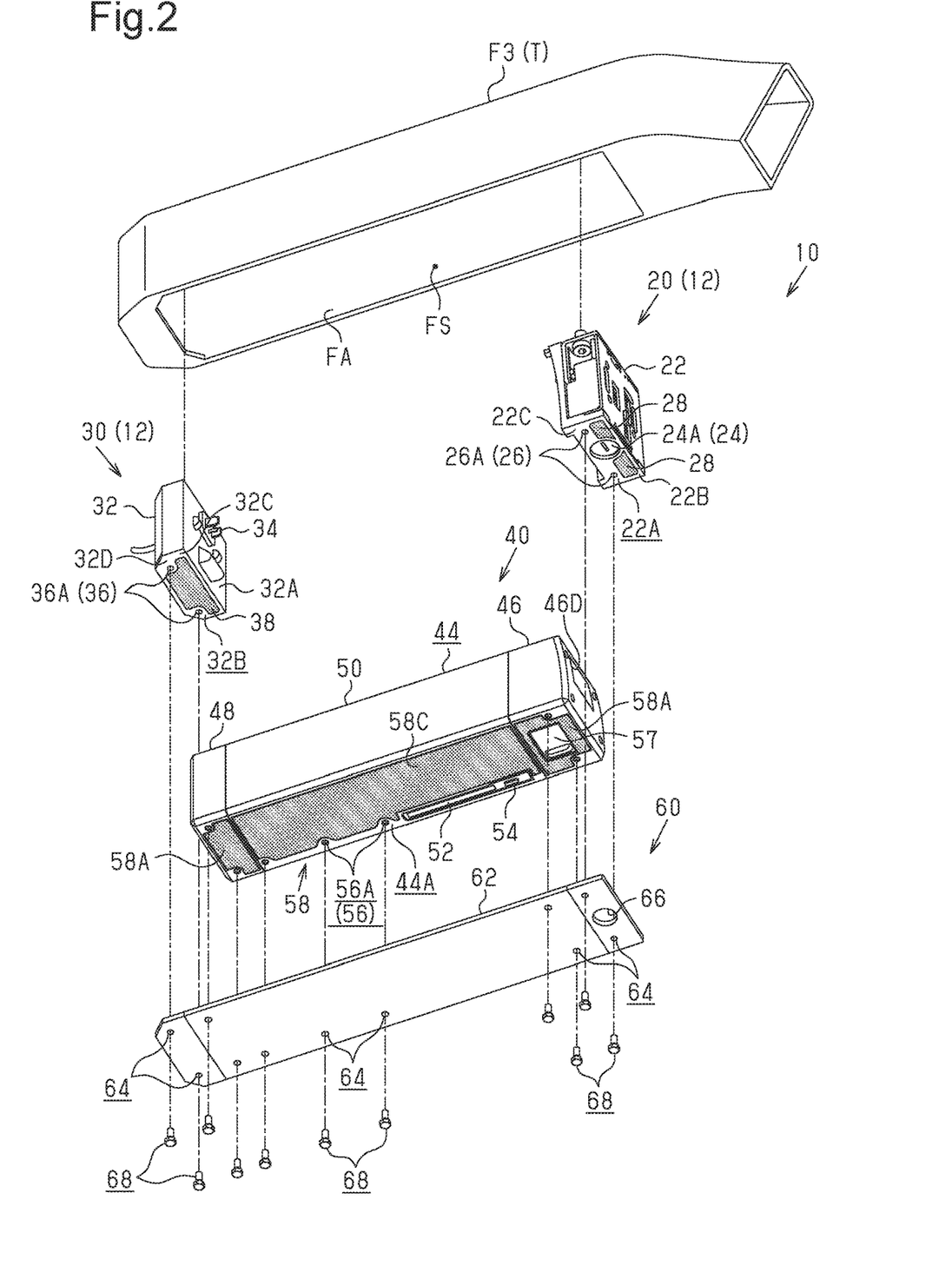
FIG. 2 is an exploded perspective view of a down tube and a battery component including the battery unit shown in FIG. 1.

As shown in FIG. 2, the battery component 10 includes a battery holder 12 and a bicycle battery unit (hereafter referred to as "the battery unit 40"). The battery component 10 further includes a cover 60. However, the cover 60 can be omitted from the battery component 10. The battery holder 12 is coupled to the down tube F3. The battery holder 12 holds the battery unit 40 in a removable manner. However, the battery holder 12 can hold the battery unit 40 in a non-removable manner.

The battery unit 40 is substantially box-shaped, e.g. rectangular parallelepiped. When held by the battery holder 12, the battery unit 40 is configured to supply electrical power via the battery holder 12 to an element that is electrically connected to the battery holder 12. The element electrically connected to the battery holder 12 includes an electric component (not shown) of the bicycle B (refer to FIG. 1). An electric component includes at least one of an assist drive unit, an electric gear changer, an electric suspension, an electric seatpost, a display unit, a cycle computer and an electric operation unit.

The battery unit 40 includes a plurality of batteries 42 (refer to FIG. 3) and a housing 44. The housing 44 is configured to accommodate the batteries 42. The housing 44 is formed from, for example, a synthetic resin. One example of a synthetic resin is polycarbonate. The housing 44 is substantially box-shaped, e.g. rectangular parallelepiped.

The housing 44 further includes a first section 46, a second section 48 and a third section 50. The first section 46 is defined by one end of the housing 44 in a first direction. The second section 48 is defined by the other end of the housing 44 in the first direction. The third section 50 is defined by the middle portion of the housing 44 in the first direction and located between the first section 46 and the second section 48. The third section 50 is coupled to the first section 46 and the second section 48. It is preferred that the dimension of the housing 44 in the first direction be greater than the dimension of the housing 44 that is a direction orthogonal to the first direction. In the example shown in FIG. 2, the first direction of the housing 44 is parallel to the longitudinal direction of the housing 44.

The battery holder 12 includes a first battery holder 20 and a second battery holder 30. The first battery holder 20 and the second battery holder 30 are spaced apart from each other and separately coupled to the down tube F3. The first battery holder 20 is configured to hold the first section 46 of the battery unit 40. The second battery holder 30 is configured to hold the second section 48 of the battery unit 40. In a state in which the first battery holder 20 is coupled, for example, to the down tube F3, the first battery holder 20 is located at a higher position than the second battery holder 30. However, the first battery holder 20 can be located at a lower position than the second battery holder 30 in a state coupled to the down tube F3.

The first battery holder 20 includes a first base 22, a holding portion (not shown), a lock mechanism 24 and a cover coupling portion 26. The first base 22 includes a first surface (not shown) and a second surface 22A. The first surface is opposed to the first section 46 of the battery unit 40. The second surface 22A is the end surface of the first base 22 located at the downstream side in the direction in which the battery unit 40 is moved when removed from the battery holder 12.

The holding portion is supported by the first base 22 so as to project out of the first surface. The holding portion is movable between a first position and a second position. At the first position, the holding portion is configured to hold the battery unit 40 by contacting a held portion 46D of the first section 46 of the battery unit 40. At the second position, the holding portion is separated from the held portion 46D.

The lock mechanism 24 is configured to hold the holding portion at the first position. The lock mechanism 24 is provided in, for example, the first base 22. However, the lock mechanism 24 can be provided outside the first base 22. The lock mechanism 24 includes a key cylinder 24A. The key cylinder 24A is exposed to the outside from the second surface 22A of the first base 22. The key cylinder 24A is operated by a key and coupled to the holding portion so that the holding portion is provided at one of the first position and the second position.

The cover coupling portion 26 includes a mechanism that allows the cover 60 to be coupled to the first battery holder 20. The cover coupling portion 26 is located on the second surface 22A of the first base 22. The cover coupling portion 26 includes threaded holes 26A. The number of the threaded holes 26A can be, for example, two.

The second battery holder 30 includes a second base 32, a plug 34 and a cover coupling portion 36. The second base 32 includes a first surface 32A and a second surface 32B. The first surface 32A is opposed to the second section 48 of the battery unit 40. The second surface 32B is the end surface of the second base 32 at the downstream side in the removal direction.

The plug 34 is provided on the second base 32 and electrically connectable to the battery unit 40. It is preferred that the plug 34 project out of the first surface 32A of the second base 32. The plug 34 is configured to be connected to a socket 48D (refer to FIG. 3) in a state in which the battery unit 40 is held by the second battery holder 30. The socket 48D is provided on the second section 48 of the battery unit 40, An electronic component (not shown) electrically connected to the plug 34 can be provided in the second base 32. The electronic component can be a circuit board or electric wiring.

The cover coupling portion 36 includes a mechanism that allows the cover 60 to be coupled to the second battery holder 30. The cover coupling portion 36 is located on the second surface 32B of the second base 32. The cover coupling portion 36 includes threaded holes 36A. The number of the threaded holes 36A can be, for example, two.

Figure 3:
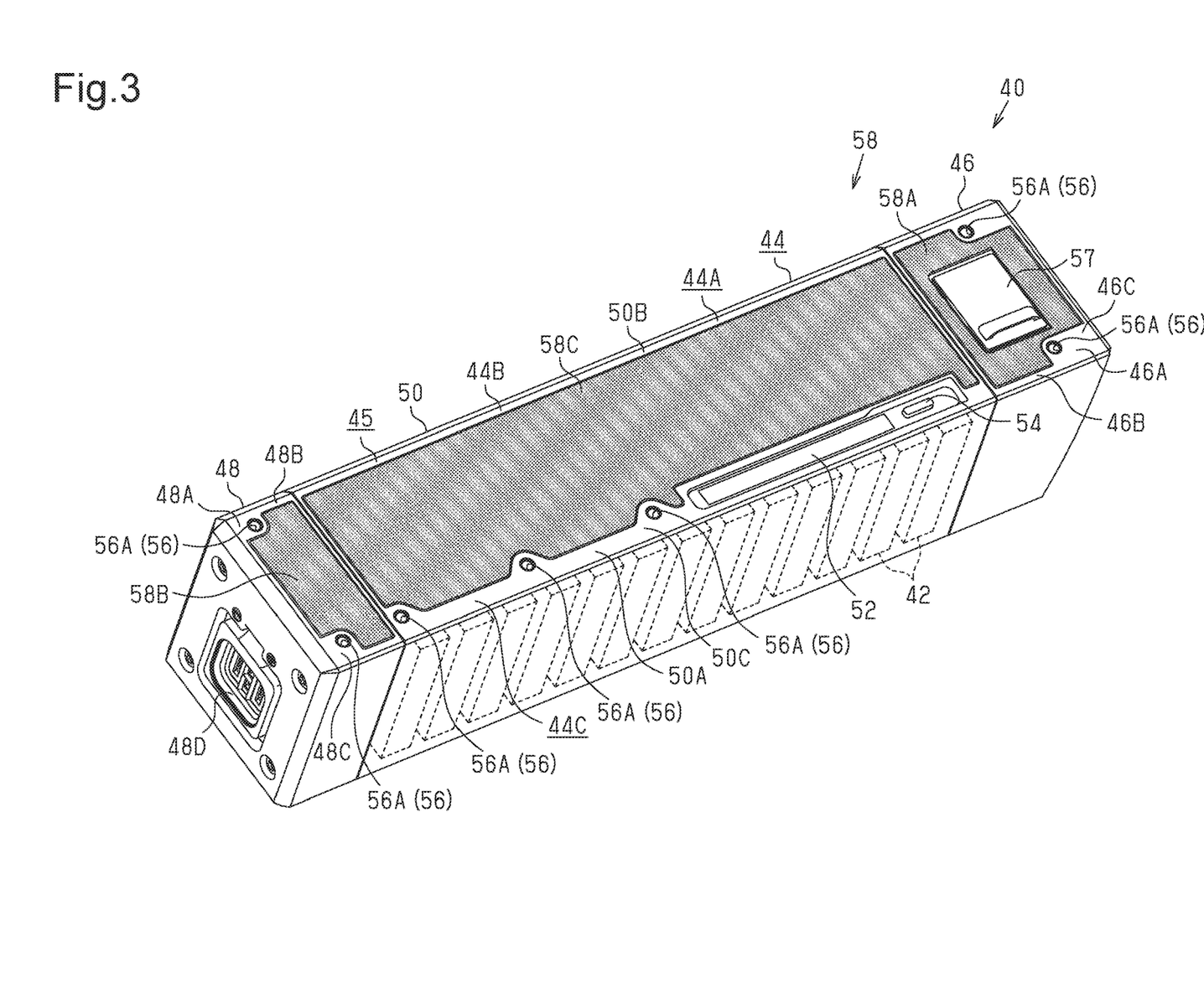
FIG. 3 is a perspective view of the battery unit shown in FIG. 2.

As shown in FIG. 3, the battery unit 40 further includes a display 52, an operation portion 54 and a cover coupling portion 56. The cover coupling portion 56 includes a mechanism that allows the cover 60 (refer to FIG. 2) to be coupled to the housing 44. The cover coupling portion 56 is located on the housing 44. It is preferred that the cover coupling portion 56 by located on one side wall 45 of the housing 44. The cover coupling portion 56 is located on, for example, a first side wall 44A of the housing 44. The first side wall 44A is the end surface of the housing 44 at the downstream side in the removal direction. Further, the first side wall 44A is exposed from the opening FA of the down tube F3 (refer to FIG. 2) in a state in which the battery unit 40 is held by the battery holder 12.

The first side wall 44A includes a first surface 46A defined by the first section 46, a first surface 48A defined by the second section 48 and a first surface 50A defined by the third section 50. The cover coupling portion 56 is included in each of the first surfaces 46A, 48A and 50A. The cover coupling portion 56 includes a plurality of threaded holes 56A. For example, the first surface 46A of the first section 46 includes two of the threaded holes 56A, the first surface 48A of the second section 48 includes two of the threaded holes 56A, and the first surface 50A of the third section 50 includes three of the threaded holes 56A. The number and location of the threaded holes 56A can be changed as needed and/or desired.

The display 52 and the operation portion 54 are provided on the housing 44. It is preferred that the display 52 and the operation portion 54 be located on one side wall 45 of the housing 44. The display 52 and the operation portion 54 are located on, for example, the first surface 50A of the third section 50, The display 52 and the operation portion 54 are provided next to each other on the periphery 50B of the first surface 50A. The display 52 includes a liquid crystal panel or an LED display. The display 52 is configured to display, for example, the state of charge of the battery unit 40. The operation portion 54 includes a switch. The operation portion 54 allows the power supply of the battery unit 40 to be switched on and off.

Preferably, the battery unit 40 further includes a charging connector (not shown) and a lid 57. The charging connector is provided in the first section 46, and is used to supply power to the batteries 42. The lid 57 is coupled in a removable manner to the first section 46, and covers the charging connector so that the charging connector is not exposed to the outside.

Figure 4:
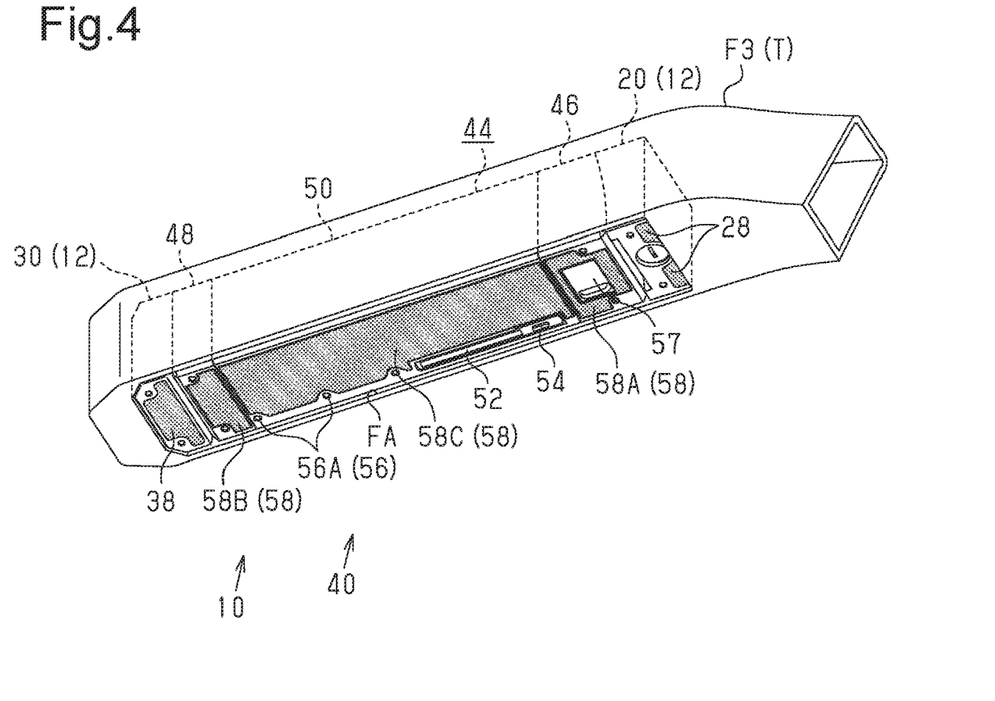
FIG. 4 is a perspective view showing the battery unit of FIG. 2 is a first usage mode.

The battery unit 40 further includes a protector 58 (hereafter referred to as "the battery protector 58"). The shaded portions in FIGS. 2 to 4 show the battery protector 58, a first holder protector 28 and a second holder protector 38, which will be described later.

The battery protector 58 is integrally provided with at least a portion of the outer surface of the housing 44. The battery protector 58 has a lower hardness than a hardness of the housing 44. It is preferred that the battery protector 58 have a hardness in the range of Shore A 60 to Shore A 80, and for example, more preferably a hardness approximately Shore A 70.

The battery protector 58 is formed from, for example, a resin. One example of the material of the battery protector 58 is an elastomer. The battery protector 58 is provided on the housing 44 (refer to FIG. 4) so as to be exposed from the down tube F3 in a state in which the housing 44 is coupled to the down tube F3 of the bicycle B. The battery protector 58 has a thickness set so that the outer surface of the cover 60 is substantially flush with the outer surface of the down tube F3 in a state in which the housing 44 is coupled to the down tube F3 and the cover 60 (refer to FIG. 2) is coupled to the housing 44.

The battery protector 58 is provided on one side wall 45 of the housing 44 so as not to extend out of the periphery of the side wall 45. For example, the battery protector 58 is provided on the first side wall 44A so as not to extend out of the periphery 44B of the first side wall 44A of the housing 44. Further, the battery protector 58 is provided on the housing 44 so that one side wall 45 of the housing 44 is exposed from the battery protector 58. For example, the battery protector 58 is provided on the housing 44 so that the peripheral portion 44C of the first side wall 44A of the housing 44 is exposed from the battery protector 58. The peripheral portion 44C of the first side wall 44A includes the periphery 44B of the first side wall 44A and the region of the first side wall 44A proximate to the periphery 44B. It is preferred that the battery protector 58 be provided on the housing 44 so that the first side wall 44A is exposed over a range from 5 mm to 3 cm from the periphery 44B toward the inner side.

The battery protector 58 is adhered, applied or welded to the housing 44. In the present embodiment, the battery protector 58 is applied by double-sided tape to the first side wall 44A. The battery protector 58 can be adhered by an adhesive to the housing 44, or can be welded by the heat of a laser or the like to the housing 44.

The outer surface of the battery protector 58 is substantially flush with, for example, the outer surface of the peripheral portion 44C. The portion of the first side wall 44A, on which the battery protector 58 is provided, is a flat surface that is recessed from the peripheral portion 44C. The battery protector 58 has a flat outer surface. The battery protector 58 is provided on the housing 44 so that the display 52 is exposed from the battery protector 58. The battery protector 58 is provided on the housing 44 so that the operation portion 54 is exposed from the battery protector 58. The battery protector 58 is provided on the housing 44 so that the cover coupling portion 56 is exposed from the battery protector 58. It is preferred that the battery protector 58 be provided on the housing 44 so that portions around the threaded holes 56A are exposed from the battery protector 58. It is preferred that the battery protector 58 have a thickness in the range from 0.1 mm to 10.0 mm in a direction that is orthogonal to the first side wall 44A.

The battery protector 58 includes a first protector portion 58A, a second protector portion 58B and a third protector portion 58C. The protector portions 58A to 58C are separately provided on the housing 44. The first protector portion 58A is provided on the first surface 46A of the first section 46. The first protector portion 58A is provided on the first surface 46A so as not to extend outward from the periphery 46B of the first surface 46A. The first protector portion 58A is provided on the first surface 46A so that a peripheral portion 46C of the first surface 46A is exposed from the first protector portion 58A. The peripheral portion 46C of the first surface 46A includes the periphery 46B of the first surface 46A and the region of the first surface 46A proximate to the periphery 46B. The first protector portion 58A is provided on the first surface 46A so that the threaded holes 56A of the first surface 46A are exposed from the first protector portion 58A. The first protector portion 58A includes a flat outer surface.

The second protector portion 58B is provided on, for example, the first surface 48A of the second section 48. The second protector portion 58B is provided on the first surface 48A so as not to extend outward from the periphery 48B of the first surface 48A. The second protector portion 58B is provided on the first surface 48A so that a peripheral portion 48C of the first surface 48A is exposed from the second protector portion 58B. The peripheral portion 48C of the first surface 48A includes the periphery 48B of the first surface 48A and the region of the first surface 48A proximate to the periphery 48B. The second protector portion 58B is provided on the first surface 48A so that the threaded holes 56A of the first surface 48A are exposed from the second protector portion 58B. The second protector portion 58B includes a flat outer surface.

The third protector portion 58C is provided on, for example, the first surface 50A of the third section 50. The third protector portion 58C is provided on the first surface 50A so as not to extend outward from the periphery 50B of the first surface 50A. The third protector portion 58C is provided on the first surface 50A so that a peripheral portion 50C of the first surface 50A is exposed from the third protector portion 58C. The peripheral portion 50C of the first surface 50A includes the periphery 50B of the first surface 50A and the region of the first surface 50A proximate to the periphery 50B. The third protector portion 58C is provided on the first surface 50A so that the display 52, the operation portion 54 and the cover coupling portion 56 are exposed from the third protector portion 58C. The third protector portion 58C includes a flat outer surface. The portion connecting the first section 46 and the third section 50 and the portion connecting the second section 48 and the third section 50 are free from and exposed from the battery protector 58.

As shown in FIG. 2, the first battery holder 20 further includes the first holder protector 28. The structure of the first holder protector 28 is, for example, substantially the same as the battery protector 58. The first holder protector 28 is, for example, adhered, applied, or welded to the second surface 22A of the first base 22 to be provided integrally with the second surface 22A. The first holder protector 28 is provided on the second surface 22A so as not to extend outward from the periphery 22B of the second surface 22A. The first holder protector 28 is provided on the second surface 22A so that a peripheral portion 22C of the second surface 22A is exposed from the first holder protector 28. The peripheral portion 22C of the second surface 22A includes the periphery 22B of the second surface 22A and the region of the second surface 22A proximate to the periphery 22B. In the present embodiment, the first holder protector 28 is divided into segments and provided on the second surface 22A. However, the first holder protector 28 does not have to be divided into segments. The first holder protector 28 is provided on the second surface 22A so that the key cylinder 24A and the cover coupling portion 26 are exposed from the first holder protector 28. Thus, the key cylinder 24A and the cover coupling portion 26 can be used in a state in which the first holder protector 28 is coupled to the second surface 22A. The first holder protector 28 includes a flat outer surface.

The second battery holder 30 further includes the second holder protector 38. The second holder protector 38 has substantially the same structure as, for example, the battery protector 58. The second holder protector 38 is adhered, applied, or welded to the second surface 32B of the second base 32 and provided integrally with the second surface 32B. The second holder protector 38 is provided on the second surface 32B so as not to extend outward from the periphery 32C of the second surface 32B. The second holder protector 38 is provided on the second surface 32B so that a peripheral portion 32D of the second surface 32B is exposed from the second holder protector 38. The peripheral portion 32D of the second surface 32B includes the periphery 32C of the second surface 32B and the region of the second surface 32B proximate to the periphery 32C. The second holder protector 38 is provided on the second surface 32B so that the threaded holes 36A are exposed from the second holder protector 38. This allows the threaded holes 36A to be used in a state in which the second holder protector 38 remains coupled to the second surface 32B. The second holder protector 38 includes a flat outer surface.

The cover 60 includes a cover body 62, a plurality of holes 64 and a through hole 66. The cover body 62 and the opening FA of the down tube F3 have similar shapes. The through hole 66 exposes the key cylinder 24A to the outside. The through hole 66 extends through the cover body 62 at a portion opposed to the key cylinder 24A in a state in which the battery component 10 is coupled to the down tube F3. The holes 64 allow for the insertion of bolts 68. The holes 64 extend through the cover body 62 at portions corresponding to the threaded holes 26A, 36A and 56A in a state in which the battery component 10 is coupled to the down tube F3. In a state in which the battery unit 40 is held by the battery holder 12 that is coupled to the down tube F3, the bolts 68 are inserted through the holes 64 and fastened to the threaded holes 26A, 36A and 56A. This couples the cover 60 to the battery holder 12 and the battery unit 40.

Figure 5:
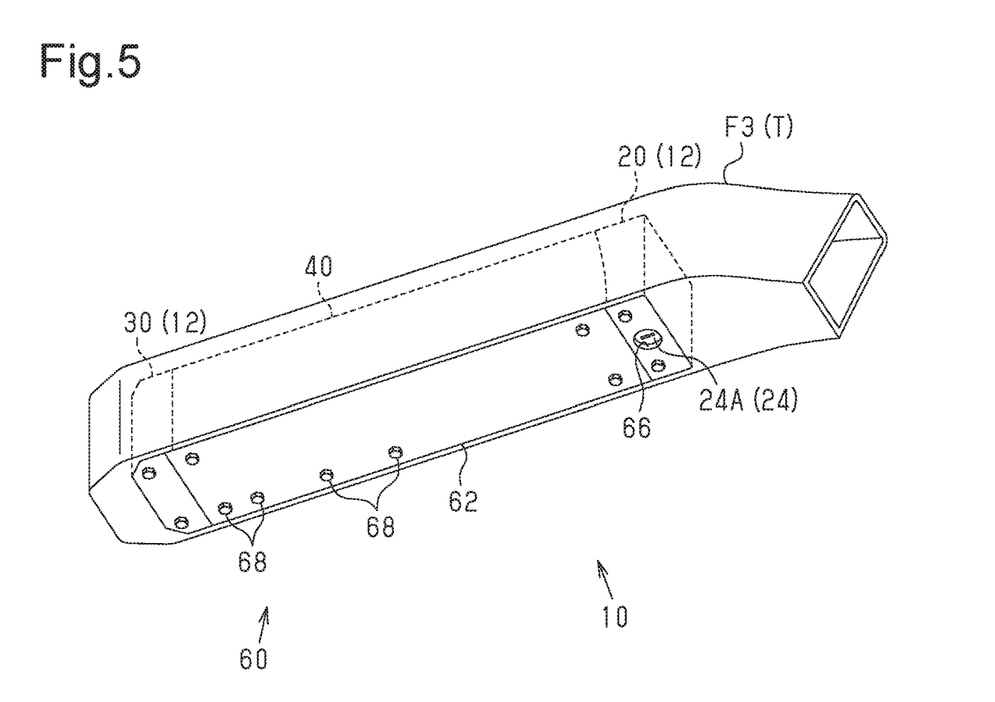
FIG. 5 is a perspective view showing the battery unit of FIG. 2 is a second usage mode.

With reference to FIGS. 4 and 5, the usage mode of the battery unit 40 will now be described. FIG. 4 shows the battery unit 40 in a first usage mode. In the first usage mode, the cover 60 is not coupled to the battery unit 40, and the holder protectors 28 and 38 and the battery protector 58 are exposed to the outside. In the first usage mode, the battery protector 58 and the holder protectors 28 and 38 reduce the effect of an obstacle that contacts the battery unit 40 and the battery holders 20 and 30.

FIG. 5 shows the battery unit 40 in a second usage mode. In the second usage mode, the battery unit 40 is coupled to the cover 60, and the battery holder 12 and the battery unit 40 are used in a non-exposed state. In the second usage mode, the cover 60 shields the battery holder 12 and the housing 44 from obstacles.

Modified Examples

The present invention is not limited to the foregoing embodiment and various changes and modifications of its components can be made without departing from the scope of the present invention. Also, the components disclosed in the embodiment can be assembled in any combination for embodying the present invention. For example, some of the components can be omitted from all components disclosed in the embodiment. Further, components in different embodiments can be appropriately combined.

Figure 6:
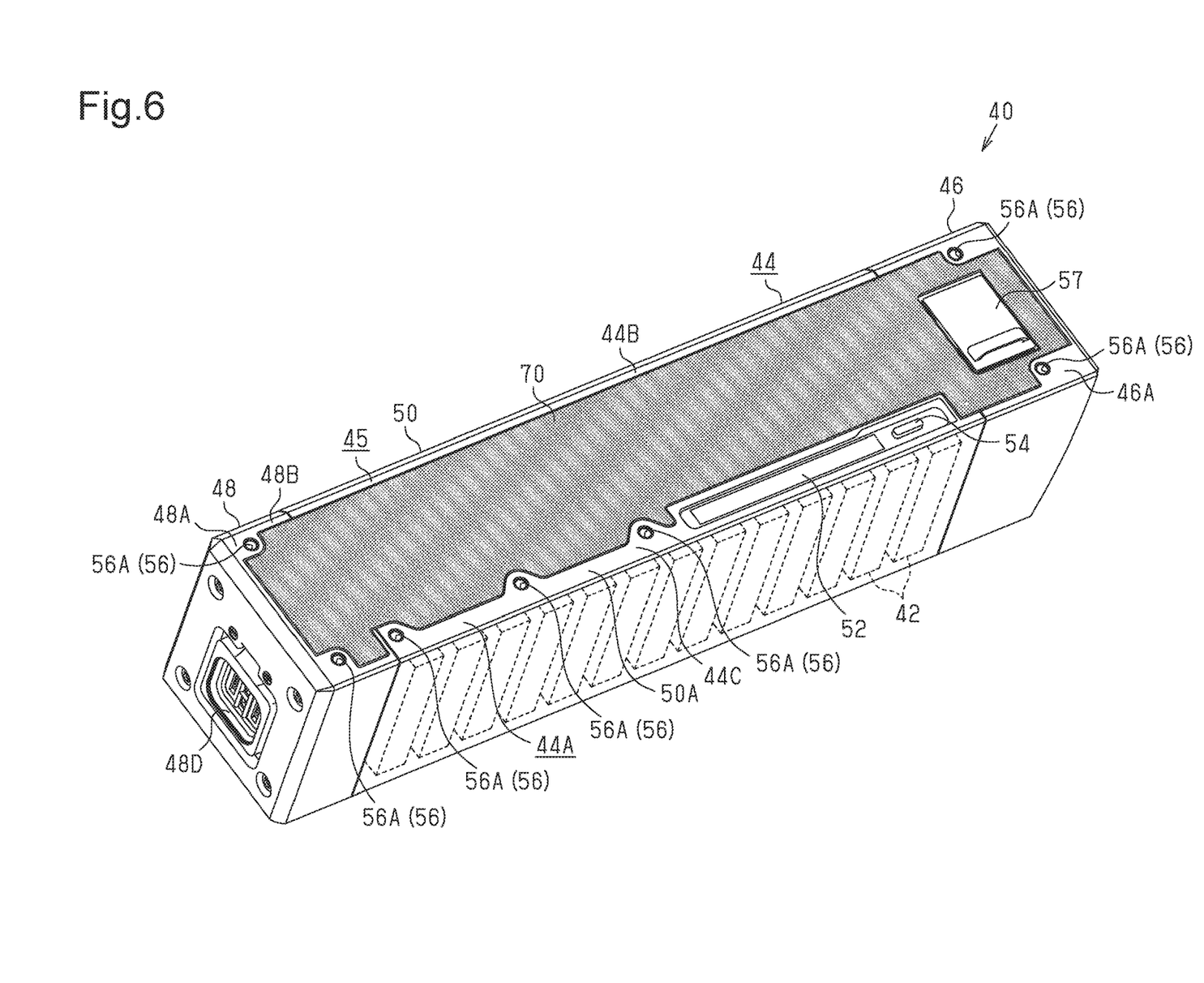
FIG. 6 is a perspective view showing a modified example of a battery unit.

Referring to FIG. 6, a modified example of the battery unit 40 includes a battery protector 70 instead of the battery protector 58 (refer to FIG. 3). The battery protector 70 is, for example, a single sheet. The battery protector 70 has substantially the same structure as the battery protector 58, and thus, the battery protector 70 will not be described. The battery protector 70 is provided on the first side wall 44A of the housing 44. The battery protector 70 is, for example, adhered, applied, or welded to the first side wall 44A and provided integrally with the first side wall 44A. The battery protector 70 is provided on the first side wall 44A so as not to extend outward from the periphery 44B of the first side wall 44A. The battery protector 70 is provided on the housing 44 so that the peripheral portion 44C of the first side wall 44A of the housing 44 is exposed from the battery protector 70. The battery protector 70 is provided on the first side wall 44A extending over the portion connecting the first section 46 and the third section 50 and the portion connecting the second section 48 and the third section 50. The battery protector 70 is provided on the first side wall 44A so that the display 52, the operation portion 54 and the cover coupling portion 56 are exposed from the battery protector 70. The battery protector 70 includes a flat outer surface. It is preferred that the battery protector 58 be provided on the housing 44 so that portions around the threaded holes 56A are exposed from the battery protector 58.

A modified example of the cover coupling portions 26, 36 and 56 can each include one or more engagement portions instead of the threaded holes 26A, 36A and 56A. In this modified example, the cover 60 is coupled to the engagement portions to couple the cover 60 to the battery holder 12 and the battery unit 40 in a removable or non-removable manner.

In a modified example of the battery component 10, at least one of the cover coupling portions 26, 36 and 56 can be omitted. Alternatively, the cover coupling portions 26, 36 and 56 can all be omitted.

In a modified example, the battery protector 58 is provided on the housing 44 covering the threaded holes 56A. In a modified example, the holder protectors 28 and 38 are provided on the battery holders 20 and 30 covering the threaded holes 26A and 36A.

In a modified example, the battery protector 58 is provided on the housing 44 covering at least one of the display 52 and the operation portion 54. When the battery protector 58 covers the display 52, it is preferred that the battery protector 58 be formed from a transparent material. When the battery protector 58 covers the operation portion 54, it is preferred that the battery protector 58 be formed from a flexible material.

In a modified example, at least one of the display 52 and the operation portion 54 can be eliminated.

The outer surface of the battery protector 58 does not necessarily have to be flat. In a first example, the outer surface of the battery protector 58 can include projections and recesses. In this example, the first side wall 44A is shaped including projections and recesses. In a second example, the outer surface of the battery protector 58 can be curved. In this example, the first side wall 44A is shaped including a curved surface. The outer surface of the battery protector 58 is shaped in accordance with the shape of the first side wall 44A.

The outer surfaces of the holder protectors 28 and 38 do not necessarily have to be flat. In a first example, the holder protectors 28 and 38 can include projections and recesses. In this example, the second surfaces 22A and 32B are shaped including projections and recesses. In a second example, the outer surfaces of the holder protectors 28 and 38 can be curved. The outer surfaces of the holder protectors 28 and 38 are shaped in accordance with the shapes of the second surfaces 22A and 32B.

The outer surface of the battery protector 58 and the outer surface of the peripheral portion 44C can have any relationship. In a first example, the outer surface of the battery protector 58 can project from the outer surface of the peripheral portion 44C. In a second example, the outer surface of the battery protector 58 is recessed from the outer surface of the peripheral portion 44C.

The portion of the first side wall 44A where the battery protector 58 is provided can be formed by a flat surface that is not recessed from the peripheral portion 44C.

The battery protector 58 and the holder protectors 28 and 28 can be formed from any material. In the first example, the material of the battery protector 58 is nylon. The battery protector 58 can be transparent or opaque. In a second example, the material of the battery protector 58 is a metal. The holder protectors 28 and 38 can also be formed from nylon or a metal.

The hardness of the battery protector 58 and the hardness of the housing 44 can have any relationship. In a first example, the hardness of the battery protector 58 is substantially the same as the hardness of the housing 44. In a second example, the battery protector 58 has a higher hardness than the housing 44.

The hardness of the holder protectors 28 and 38 and the hardness of the housing 44 can have any relationship. In a first example, the holder protectors 28 and 38 have the same hardness as the housing 44. In a second example, the holder protectors 28 and 38 have a higher hardness than the housing 44.

The method for fixing the battery protector 58 to the housing 44 can be changed. In a first example, the battery protector 58 is fixed by bolts or the like to the housing 44 in a removable manner. In a second example, the battery protector 58 is formed integrally with the housing 44 as a one piece member. In a second example, for example, the housing 44 and the battery protector 58 are formed through two-color molding.

The method for fixing the holder protectors 28 and 39 to the battery holders 20 and 30 can be changed. In a first example, the holder protectors 28 and 38 are fixed by bolts or the like to the battery holders 20 and 30. In a second example, the holder protectors 28 and 38 are formed integrally with the battery holders 20 and 30. In the second example, for instance, the first holder protector 28, the first battery holder 20, the second holder protector 38 and the second battery holder 30 can be formed through two-color molding.

In a modified example, the battery protector 58 is provided on the first side wall 44A so as to conceal the peripheral portion 44C of the first side wall 44A.

In a modified example, the first holder protector 28 is provided on the second surface 22A so as to conceal the peripheral portion 22C of the second surface 22A. In a modified example, the second holder protector 38 is provided on the second surface 32B so as to conceal the peripheral portion 32D of the second surface 32B.

In a modified example, the battery protector 58 is provided on the first side wall 44A extending outward from the periphery 44B of the first side wall 44A.

In a modified example, the first holder protector 28 is provided on the second surface 22A extending outward from the periphery 22B of the second surface 22A. In a modified example, the second holder protector 38 is provided on the second surface 32B extending outward from the periphery 32C of the second surface 32B.

In a modified example, the battery unit 40 can be provided on the battery protector 58 on a side wall other than the first side wall 44A.

In a modified example, at least one of the first holder protector 28 and the second holder protector 38 can be omitted from the battery component 10.

In a modified example, the third protector portion 58C of the battery protector 58 can be divided into multiple segments.

In a modified example, the battery unit 40 can have the form of a regular hexahedron.

The opening FA of the bicycle B in which the battery component 10 is provided can be open upward or sideward in a state in which the bicycle is on level ground.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated. Also, it will be understood that although the terms "first" and "second" may be used herein to describe various components these components should not be limited by these terms. These terms are only used to distinguish one component from another. Thus, for example, a first component discussed above could be termed a second component and vice versa without departing from the teachings of the present invention. Finally, terms of degree such as "substantially", "about" and "approximately" as used herein mean an amount of deviation of the modified term such that the end result is not significantly changed.

The foregoing descriptions of the embodiments according to the present invention are provided for illustration only, and not for the purpose of limiting the invention as defined by the appended claims and their equivalents.

What is claimed is:

1. A bicycle battery unit comprising:
a plurality of batteries;
a housing accommodating the plurality of batteries; and
a protector integrally provided with at least a portion of an outer surface of the housing, the outer surface of the housing having the protector facing an opening of a bicycle frame of a bicycle in a state in which the battery unit is installed into the bicycle frame, the outer surface of the housing facing a bicycle wheel of the bicycle when installed into a down tube of the bicycle frame, the protector having a lower hardness than a hardness of the housing, the protector being provided on one side wall of the housing and not on any other side wall of the housing, the protector does not extend outward from a periphery of the one side wall and so that a peripheral portion is on the one side surface on which the protector is disposed, the peripheral portion being uncovered by the protector.

2. The bicycle battery unit according to claim 1, wherein in a state in which the housing is coupled to a coupling portion of the bicycle, the protector is provided on the housing to be exposed from the coupling portion.

3. The bicycle battery unit according to claim 1, wherein the protector is formed integrally with the housing as a one-piece member.

4. The bicycle battery unit according to claim 1, wherein the protector is adhered, applied, or welded to the housing.

5. The bicycle battery unit according to claim 1, wherein the protector is formed from a resin.

6. The bicycle battery unit according to claim 1, wherein the protector is formed from a material including nylon or an elastomer.

7. The bicycle battery unit according to claim 1, wherein the protector has a flat outer surface.

8. The bicycle battery unit according to claim 1, further comprising a display provided on the housing, the protector being provided on the housing so that the display is exposed from the protector.

9. The bicycle battery unit according to claim 1, further comprising
an operation portion provided on the housing, the protector being provided on the housing so that the operation portion is exposed from the protector.

10. The bicycle battery unit according to claim 1, further comprising
a cover coupling portion located on the housing, the protector being provided on the housing so that the cover coupling portion is exposed from the protector.

11. The bicycle battery unit according to claim 10, wherein the cover coupling portion includes a threaded hole.

12. The bicycle battery unit according to claim 1, wherein
the plurality of batteries being aligned with respect to each other in a direction that is parallel to a longitudinal length of the housing.

13. The bicycle battery unit according to claim 12, wherein
the plurality of batteries being aligned with respect to each other in a direction that is parallel to a longitudinal length of the bicycle down tube when the battery unit is installed to the bicycle down tube.

14. A bicycle battery unit comprising:
a plurality of batteries;
a housing accommodating the plurality of batteries having an installation part to be installed to a bicycle frame of a bicycle; and
a protector provided on one side wall of the housing and not on another side wall so as not to extend outward from a periphery of the one side wall, the one side wall of the housing having the protector facing an opening of the bicycle frame in a state in which the battery unit is installed into the bicycle frame, the one side wall of the housing facing a bicycle wheel of the bicycle when installed into a down tube of the bicycle frame.

15. The bicycle battery unit according to claim 14, wherein the protector has a lower hardness than a hardness of the housing.

16. The bicycle battery unit according to claim 14, wherein
the one side wall being a longer side wall that faces the opening of a down tube of the bicycle frame when attached to the bicycle frame.

* * * * *